(12) United States Patent
Markman et al.

(10) Patent No.: US 7,773,855 B1
(45) Date of Patent: Aug. 10, 2010

(54) METHOD AND APPARATUS FOR INSERTION OF ADVERTISEMENTS BETWEEN VIEWINGS OF RECORDED CONTENT, GAMES AND OTHER MEDIA TYPES

(75) Inventors: Michael J. Markman, Kirkland, WA (US); James A. Billmaier, Woodinville, WA (US)

(73) Assignee: ARRIS Group, Inc., Suwanee, GA (US)

(*) Notice: Subject to any disclaimer, the term of this patent is extended or adjusted under 35 U.S.C. 154(b) by 1021 days.

(21) Appl. No.: 11/149,932

(22) Filed: Jun. 10, 2005

Related U.S. Application Data

(60) Provisional application No. 60/580,490, filed on Jun. 17, 2004.

(51) Int. Cl.
*H04N 5/91* (2006.01)
*H04N 7/26* (2006.01)

(52) U.S. Cl. .................................. 386/46; 386/124
(58) Field of Classification Search .................... 386/46
See application file for complete search history.

(56) References Cited

U.S. PATENT DOCUMENTS

| 7,030,930 B2 * | 4/2006 | Kovacevic | 348/515 |
| 2002/0188944 A1 * | 12/2002 | Noble | 725/39 |

* cited by examiner

*Primary Examiner*—Marsha D Banks Harold
*Assistant Examiner*—Oluwaseun A Adegeye
(74) *Attorney, Agent, or Firm*—Troy A. Van Aacken; Robert J. Starr

(57) ABSTRACT

A mini-TV or picture-in-graphic (PIG) window within a digital video recorder (DVR) menu may be repurposed after one or more activities, such as watching a digitally-recorded program, to display content other than live television content on a channel that was being tuned to before the one or more activities.

6 Claims, 3 Drawing Sheets

METHOD AND APPARATUS FOR INSERTION OF ADVERTISEMENTS BETWEEN VIEWINGS OF RECORDED CONTENT, GAMES AND OTHER MEDIA TYPES

CROSS-REFERENCE TO RELATED APPLICATIONS

This application claims the benefit of Provisional Application No. 60/580,490, filed Jun. 17, 2004, for "METHOD AND APPARATUS FOR INSERTION OF ADVERTISEMENTS BETWEEN VIEWINGS OF RECORDED CONTENT, GAMES AND OTHER MEDIA TYPES," with inventors Michael Markman and James A. Billmaier, which application is incorporated herein by reference in its entirety.

BACKGROUND

The audience experience of broadcast media since the earliest days of commercial radio and television is one of a continuous flow of programming on one station or channel at a time. This flow consists of a succession of content types—programming, commercial breaks, promotional announcements, etc. Unless the viewer either tunes to another station or turns off the set, the program provider is in a position to determine the entire sequence by which one program or message type flows into the next.

In this environment, it's the programmer, not the viewer who sets the sequence of various content types and the schedule on which they are aired. A viewer can choose whether or not to tune into a given program stream, and when to abandon it, but he or she has no control over the order of events, their start times, or their stop times. When one program element ends, the next program begins automatically.

The advent of the digital video recorder (DVR) and the more advanced media center-style set top box changes this pattern radically. Rather than simply experiencing a preset flow of programming and messages, the user of a DVR can invoke a series of discrete, discontinuous elements to constitute their own virtual channel. A recorded program can be played at any time of day. It can be stopped in the middle. The user can switch to another program at will. Watching TV with this kind of device is very much like playing a series of phonograph records or CDs.

This change from continuous flow to discrete events diminishes the effectiveness of standard broadcast advertising inserted into a program stream. It also diminishes the ability of a broadcaster to arrange programs in a sequence that is designed to keep the audience of a given show watching while the subsequent show begins.

For these and other reasons, broadcast program providers have voiced concern, even alarm, that the widespread adoption of digital recording devices will threaten traditional methods for attracting, holding, and advertising to a loyal audience.

In some previous DVR designs, when the playback of a recorded show or sequence ends—or is stopped by the user, the screen will typically return the user to a full-screen interactive menu system presenting a series of options that the viewer can choose to watch next.

In other previous DVR designs, when the playback of a recorded show or sequence ends—or is stopped by the user, the screen area is divided between the menu system and a small window that shows current live broadcast content. The area showing live TV is sometimes referred to as the mini-TV window or a picture-in-graphic (PIG) window. The channel to which the DVR was previously tuned will continue to stay tuned after playback of the recorded sequence. This is a wasted opportunity to control what is being displayed in the mini-TV window.

DETAILED DESCRIPTION

Figure 1:
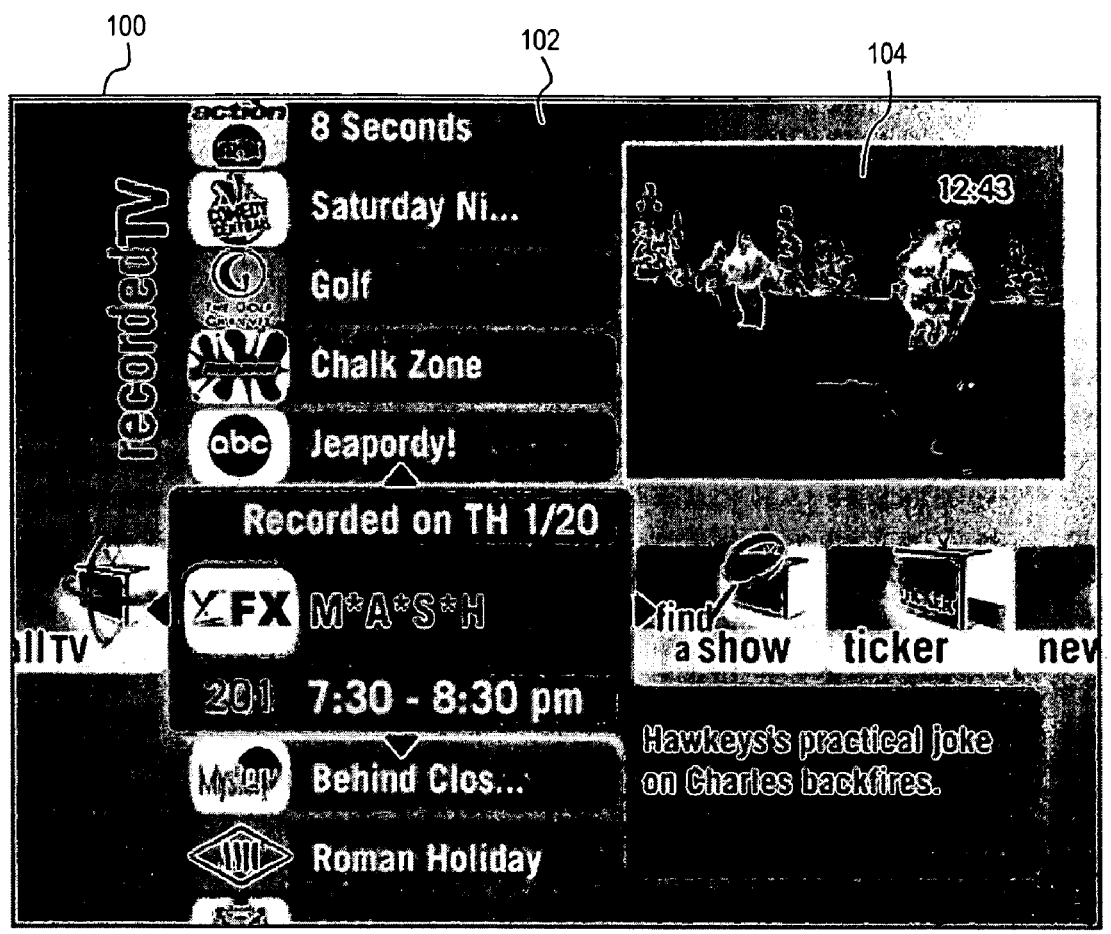
FIG. 1 is a screen shot of a DVR program menu showing a mini-TV or PIG window.

Where traditional continuous broadcasting confines opportunities for advertising within a program, a system in accordance with a presently preferred embodiment of the invention provides opportunities to advertise in the mini-TV window in the interval during which a viewer selects the next program to watch in the context of a DVR interface. Thus, new opportunities may be provided for broadcast promo providers to reach and influence the DVR audience. Broadcasters are provided with a stage to move past the limitations of their own predetermined show flow, and place messages in a show flow that is being assembled on the fly by the viewer's discrete choices.

In brief summary of one presently preferred embodiment, live television content received on a first broadcast channel is displayed. Thereafter, a digital video recorder (DVR) program menu is displayed showing available digitally-recorded programs in response to a user command. In one embodiment, the DVR program menu further includes a picture-in-graphic (PIG) window showing a reduced-size version of the live television content on the first broadcast channel. A user may be allowed to select one of the digitally-recorded programs for display, after which at least a portion of the selected digitally-recorded program presented. The DVR program menu is redisplayed in response to the digitally-recorded program terminating (either in natural course or by a user command). However, the PIG window is automatically repurposed to show different content other than the live television content received on the first broadcast channel.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

In order to create new advertising opportunities for the broadcaster, a method and apparatus are provided which can utilize the mini-TV window to display advertising and promotional messages that originate with the network of the most recently viewed recorded show, rather than displaying whatever random programming is currently available by the live tuner.

By extending the presence of the originating network beyond the end of a recorded show, this invention creates new advertising and promotional opportunities. The mini-TV window space can also be made available for sale to competing networks, to cable system operators, direct-broadcast satellite operators, or directly to other advertisers.

In one embodiment, a home entertainment client terminal is capable of receiving, recording, storing, and displaying a variety of audio-visual programming in multiple formats. These may include currently used video encoding formats, such as MPEG, MPEG2, MPEG4, Windows Media, Flash, etc. It can be extended to include future formats as well.

The client terminal may also include a component for scaling (adjusting the size) of audio-visual programming to fit within partial screen areas. The client terminal may also include a component for combining on the same screen both an interactive menu system and an audio-visual program element (the message).

The client terminal may further include a component for generating a unique identifier for every message available to the system. This can be through a request (by internet, phone, or other means) to a central system. This can also be by allocating blocks of identifiers in advance to all participating message originators The client terminal may also include a component for associating the unique identifier to the message at all phases of transmission, storage, and display. The client terminal may also further a component for associating with each unique message a set of parameters that can be used to determine its relevance to a particular audience at a particular time (e.g. when to begin running it, during what dates and times of days to run it, when to expire it, and other factors that can determine its relevance such as—but not limited to—audience age range, gender, income level, geographical areas in which to show it, related program genres and categories, product categories and brands The client terminal may additionally include a component for receiving, storing, and executing a set of rules that associate the message to another program that was previously viewed. In certain embodiments, the client terminal may include a component for sequencing a series of messages that will play while the user is within the menu screen—determining a running order, and showing them in sequence The client terminal may also include a component for tuning to a designated channel at the end of the sequence (for example the channel that sponsored the most recently viewed message, or a channel dedicated to promoting on-demand programming from the cable system operator (known as a "barker" channel)

Alternately or additionally, the audio-visual message may be stored external to the client terminal—on other storage devices within the home, on storage and transmission devices located at the portal of the interactive service provider (i.e. Digeo), head end of the cable or satellite service provider, on servers located anywhere on the Internet, and/or on devices located at the originating network The client terminal may also include a component for receiving, storing, and executing additional rules that may modify the selection of message based on additional factors, such as audience location, gender, age, income, interests, viewing history and preferences.

The client terminal may also include a component for associating and triggering system actions if a viewer responds (for example, by pressing a designated button on the remote control) while the message is running. Some of examples of system actions that can be triggered automatically by responding to a message:

if the message is about a future program or series of programs, the action may be to schedule the client terminal to record that program or series when it is broadcast;

if the message is about an available on-demand program, the action may be to invoke a series of steps that allows the user to order the program;

if the message is about a program currently recorded and stored on the client, the action may be to watch that program next;

if the message is about a service or product offered for sale, the action may be to request more information, to request a representative to call, or to actually authorize the purchase of the product or service offered;

if the message is about a movie currently playing in theatres, the action may be to present a list of local theatres and show times and/or to invoke a series of steps leading to the purchase of a ticket.

The client terminal may also include a component for determining that an action has been taken on a particular message and then retiring it from the rotation of available messages.

The client terminal may also include a component for message originators to submit messages in supported formats and to set the rules governing when they should display: date range, time of day, geographical area, audience demographics, etc.

The client terminal may also include a component for tracking which potential messages are actually displayed, how often, and whether the display has resulted in the viewer taking an action.

The client terminal may also include a component for the service providers to authorize and invoice for messages submitted, stored, and displayed using this invention.

FIG. 1 illustrates a user interface 100 for a DVR. Recorded programs are listed in a vertical menu 102, which the user may navigate to bring a desired program into focus, e.g., M*A*S*H. FIG. 1 also illustrates a mini-TV window, sometimes referred to herein as a picture-in-graphic ("PIG") 104 window, which, as described above, is normally used for displaying the last channel that was watched on live TV. Typically, however, the user does not know, or even care, what is currently being shown on a channel that the user recently decided not to watch by making the choice to view the recorded program instead.

Figure 2:
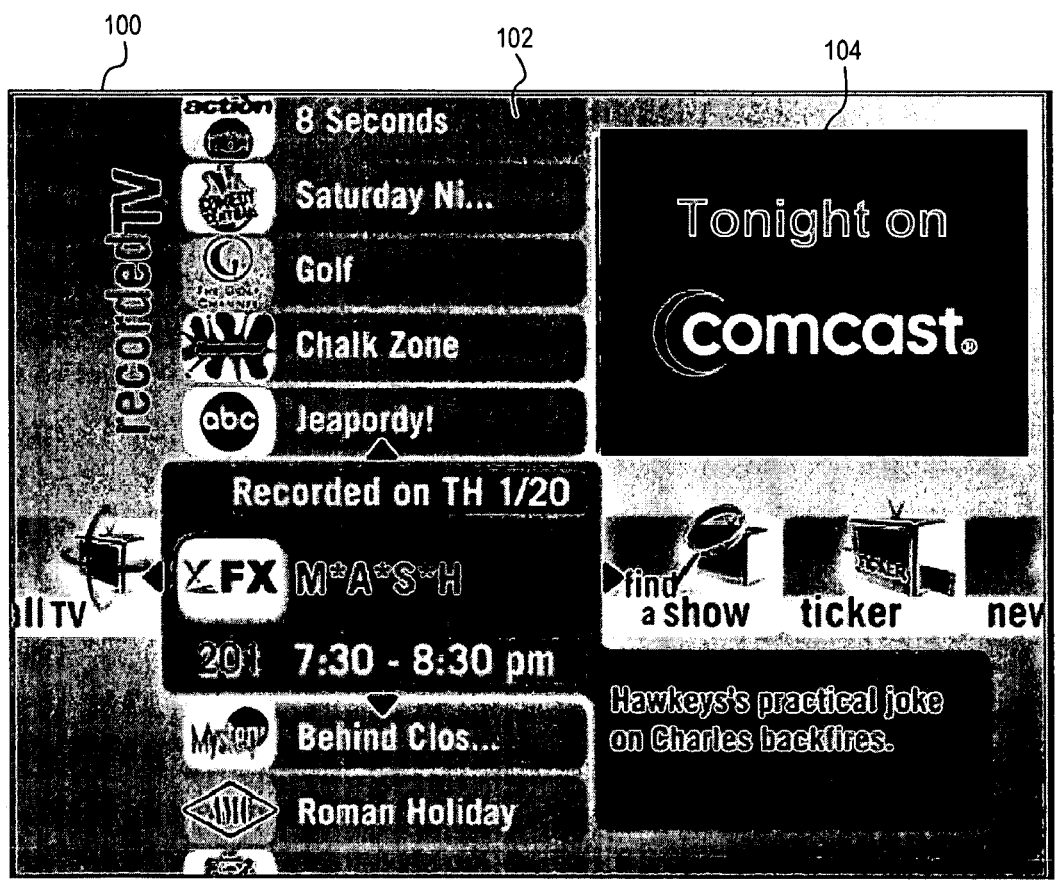
FIG. 2 is a screen shot of a DVR program menu showing a repurposed mini-TV window after presentation of a digitally-recorded program by the DVR.

Accordingly, as shown in FIG. 2, the mini-TV window 104 may be repurposed, for example, as a barker channel, showing upcoming television programs or promotions available from Comcast®. In one embodiment, the system may repurpose (or recapture) the PIG after:

DVR playback,
Playing a game,
Listening to a jukebox,
Viewing photos,
Playing a DVD or CD.

Thus, barker channel in the PIG 104 becomes a recurring platform throughout a viewing session.

In one embodiment, the barker channel in the PIG 104 may rotate through one or more of the following:

Branding bumper,
Weather, scores, headlines;
Service tips, hints, and promotions,
Paid program (VOD, SVOD) promos, MSO upgrade and service promotions (e.g. broadband Internet access), Network promotions, Local station ("Tonight on channel 5 news . . . ").

Of course, other elements may be rotated through the PIG 104 within the scope of the invention.

Figure 3:
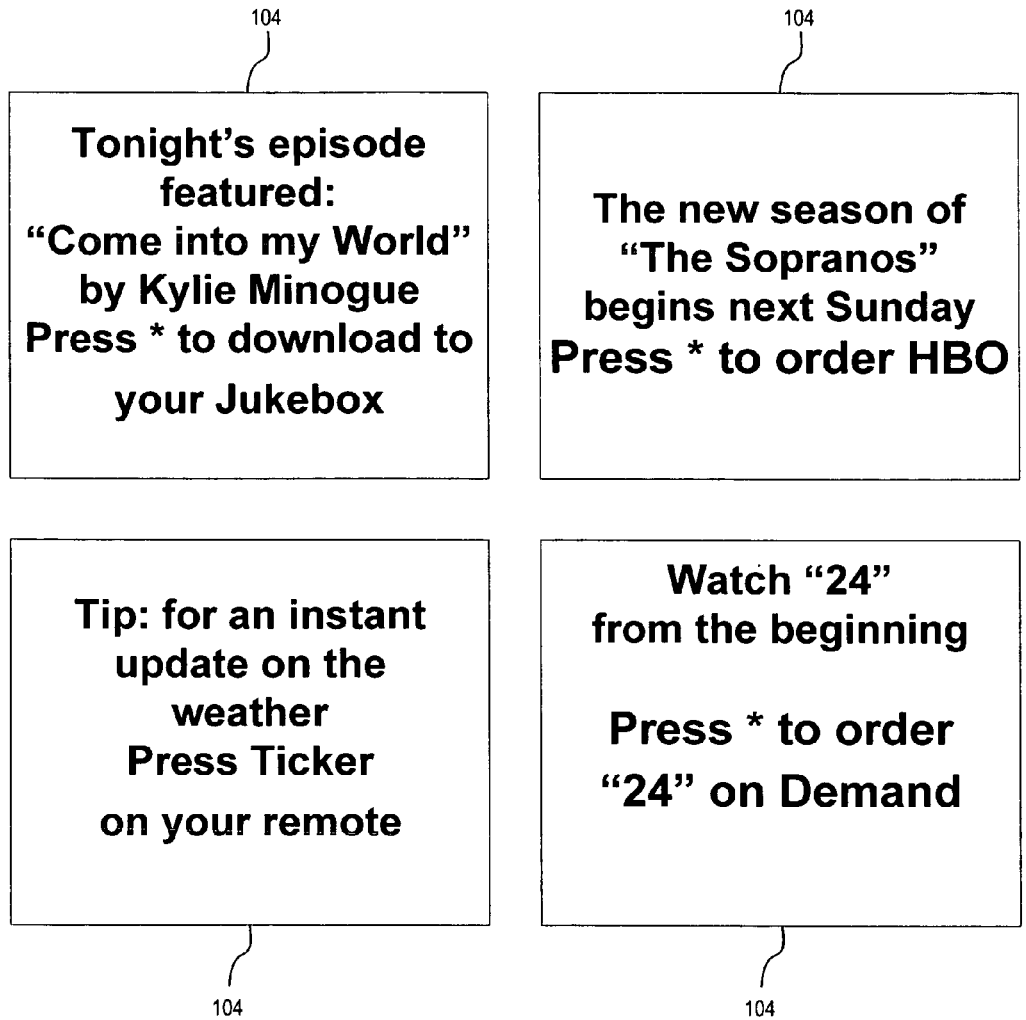
FIG. 3 illustrates various purchase or record actions available within a mini-TV window.

In certain embodiments, viewer responses may be captured (and various actions initiated) in response to a specifically-designated button or control being activated by the user. For example, the "*" button may be used to enter a viewer response. The actions may include, for example, purchase or record actions related to a promotion within the PIG 104, as shown in FIG. 3. In one embodiment, the PIG 104 keeps promotions in sight whenever the UI is visible.

Various types of media may be presented within the PIG 104, including one or more of the following (or other related media):

flash movie, video stream, series of stills, mpeg movie.

Sources of display information for the PIG 104 may include, for example, the following:

hard drive, linear video channel (broadcast), on-demand session (stored offsite), IP source.

The information may be stored in various formats, such as wma, avi, quicktime, or flash, for example. The actual flow of what is shown may be defined by a text stream with links. The text stream may include commands such as:

tune to a live channel, display asset stored on hard drive, retrieve information from the Internet.

The text stream may be stored in various formats, such as XML.

Aside from the display of a programmed barker channel of promotional information, various other ways to decide what to show in the PIG 104 after terminating a digitally-recorded program include the following:

programs related to the user's last action:

the game the user just finished playing, the recorded video program the user just watched, a picture the user just viewed;

programs related to what the user has done recently;

the time of day;

a competitors show, i.e., if the user just finished watching a show recorded from NBC®, ABC® may pay to have the PIG 104 show upcoming shows on ABC®; likewise, NBC® may pay to keep the user tuned in to NBC® programming (and may even be granted a right of first refusal to do so).

In various embodiments, what is shown may also be determined, at least in part, by a viewer's profile stored by or accessible to the DVR. For example, if a viewer's profile indicates that the viewer likes to golf, the PIG 104 may selectively display golf-related media.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

Embodiments of the invention may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments of the present invention may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs; EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

What is claimed is:

1. A method comprising:

displaying live television content received on a first broadcast channel;

displaying a program menu of a digital video recorder (DVR) showing available digitally-recorded programs in response to a user command, the DVR program menu further including a picture-in-graphic (PIG) window showing a reduced-size version of the live television content on the first broadcast channel;

allowing a user to select one of the digitally-recorded programs;

presenting at least a portion of the selected digitally-recorded program; and in response to termination of presenting the selected digitally-recorded program:

redisplaying the DVR program menu; and automatically tuning the PIG window to a second broadcast channel that is different than the first broadcast channel, wherein the second broadcast channel is automatically selected by the DVR based on the digitally-recorded program selected by the user from the DVR program menu.

2. The method of claim 1, wherein the second broadcast channel corresponds to a broadcast channel from which the selected digitally-recorded program was recorded.

3. The method of claim 1, wherein each channel is associated with a respective broadcast network, and wherein the second channel is associated with the same broadcast network as a channel from which the selected digitally-recorded program was recorded.

4. The method of claim 3, wherein the second channel is a barker channel for the broadcast network.

5. The method of claim 1, wherein each channel is associated with a respective broadcast network, and wherein the second channel is associated with a competitor of the broadcast network of a channel from which the selected digitally-recorded program was recorded.

6. A method comprising:

displaying live television content received on a first broadcast channel;

recording a plurality of digitally-recorded programs;

storing for each of the plurality of digitally-recorded programs a broadcast channel from which each digitally-recorded program is recorded;

displaying a program menu of a digital video recorder (DVR) showing the plurality of digitally-recorded programs in response to a user command, the DVR program menu further including a picture-in-graphic (PIG) window showing a reduced-size version of the live television content on the first broadcast channel;

allowing a user to select one of the digitally-recorded programs;

presenting at least a portion of the selected digitally-recorded program; and in response to termination of presenting the selected digitally-recorded program:
 redisplaying the DVR program menu; and
 retrieving the stored broadcast channel from which the selected digitally-recorded program was recorded;
 automatically tuning the PIG window to the broadcast channel from which the selected digitally-recorded program was recorded.

* * * * *